UNITED STATES PATENT OFFICE.

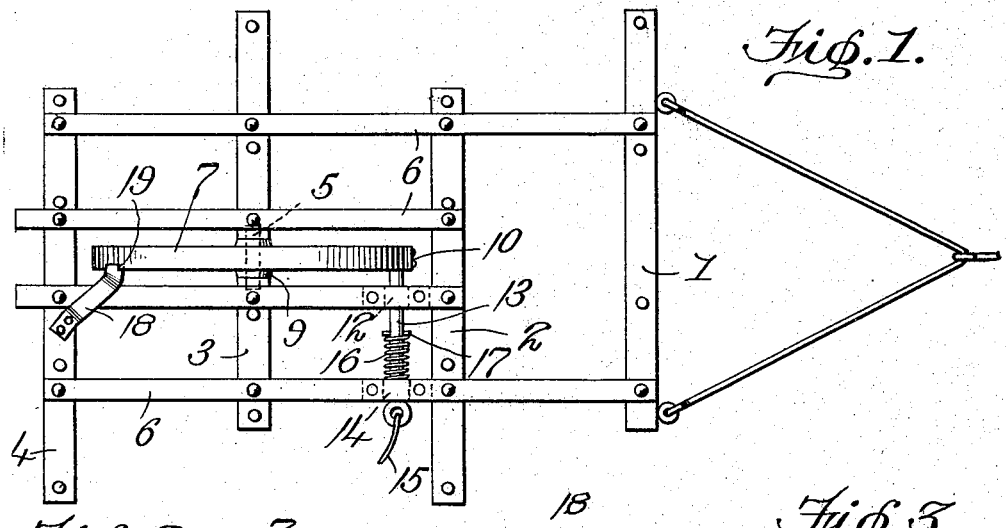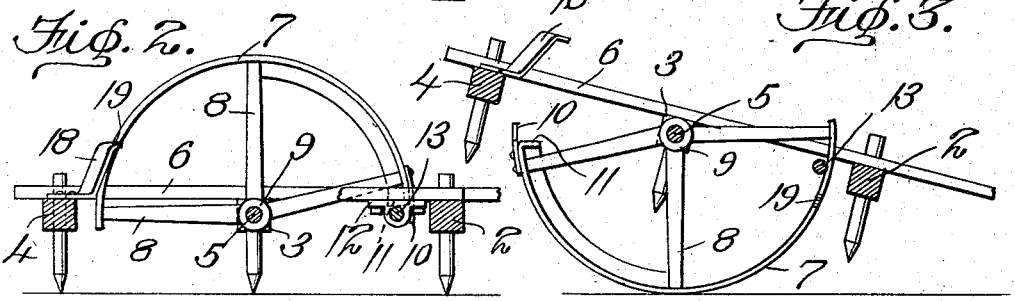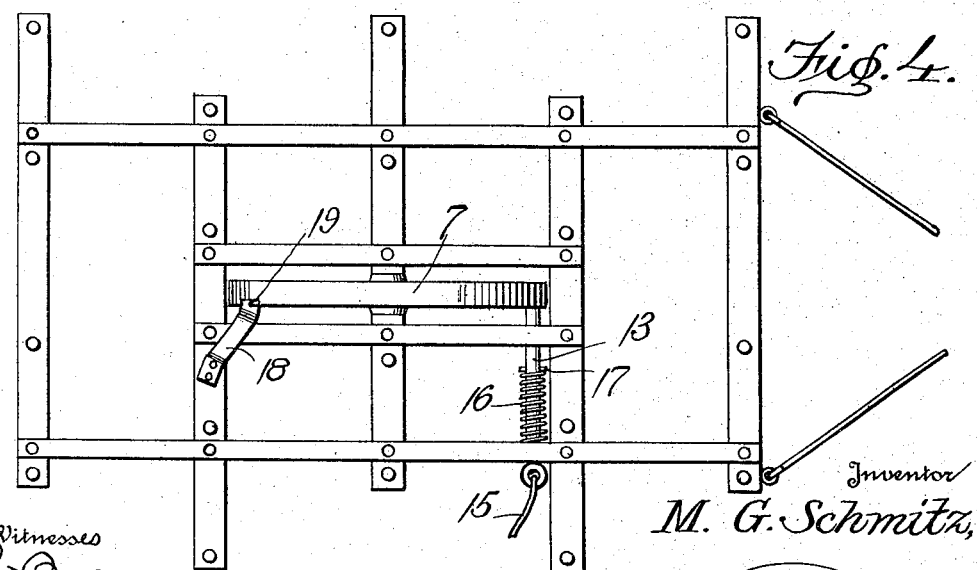

MICHAEL G. SCHMITZ, OF MEDICINE LAKE, MONTANA.

DEVICE FOR RAISING HARROWS.

1,212,695.   Specification of Letters Patent.   Patented Jan. 16, 1917.

Application filed May 12, 1916. Serial No. 97,096.

*To all whom it may concern:*

Be it known that I, MICHAEL G. SCHMITZ, a citizen of the United States, residing at Medicine Lake, in the county of Sheridan, State of Montana, have invented certain new and useful Improvements in Devices for Raising Harrows; and I do hereby declare the following to be a full, clear, and exact description of the invention, such as will enable others skilled in the art to which it appertains to make and use the same.

This invention relates to a device for raising a harrow.

An object of the invention resides in the provision of a device by means of which a harrow may be raised automatically so that the foreign material such as roots, trash or the like will pass from the teeth thereof.

A further object of the invention resides in so constructing the device that the harrow will be raised from the ground for a predetermined length of time and automatically returned to its operative position.

With these and other objects in view such as will appear as my description progresses, my invention comprises the combination and arrangement of parts as set forth in and falling within the scope of the appended claim.

In the drawing: Figure 1 is a plan view of a device constructed in accordance with my invention showing the same applied to a four-bar harrow; Fig. 2 is a vertical sectional view of the same; Fig. 3 is a similar view showing the manner in which the harrow is raised, and Fig. 4 is a plan view showing the device applied to a five-bar harrow.

In Figs. 1 to 3 inclusive, I have illustrated a harrow which includes a plurality of tooth carrying bars 1, 2, 3 and 4. The bar 3 is formed in two sections and extending between these sections is a shaft 5 for a purpose which will later appear. These bars 1 to 4 inclusive are joined together by suitable braces 6.

In order that the harrow may be raised and lowered at the will of the operator I have provided a semi-circular rim 7 which is mounted on a plurality of spokes 8 which extend to and are connected with a hub 9, which hub is mounted on the shaft 5, rotatably. One end of this semi-circular rim is provided with a plurality of teeth 10 and with a shoulder 11. In order that this rim may be normally held so that it extends upwardly from the harrow, I have mounted on one of the bars 6 a bearing member 12 in which a locking rod 13 is slidably mounted, which rod is adapted to engage the shoulder 11 and prevent the rotative movement of the rim in one direction. This rod 13 extends through a second bearing member 14 and a flexible operating member 15 is attached to the end of the rod adjacent this latter bearing member. The opposite end of the rod is normally pressed below the shoulder 11 on the rim by a coil spring 16 which encircles the rod and which bears against the bearing member 14 and a pin 17 which passes through the rod. The movement of the rim, in the opposite direction, is prevented by the engagement of the spring detent 18 with a notch 19 in the rim.

When it is desired to raise the harrow it is only necessary for the operator to withdraw the rod 13 by means of the flexible operating member 15 at which time the forward end of the rim will drop downwardly, this end being considerably heavier than the end on the opposite side of the pivot, that is to say, on the opposite side of the shaft 5. When the teeth 10 on the forward end of the rim strike the ground they will bite into the same and the continued forward movement of the harrow will cause the rim to rotate to the position shown in Fig. 3 of the drawing so that the harrow will be raised. This rotation will continue until the rim has made a complete revolution at which time its movement will be automatically arrested and the harrow restored to its initial position.

In the embodiment shown in Fig. 4 of the drawing the arrangement is identical with the exception that the rim is arranged on the intermediate bar of the five-bar harrow and it is therefore not deemed advisable or necessary to enter into a detailed description of this form inasmuch as it only in fact illustrates the application of the device to a different style of harrow. Of course it is to be understood that the rim may be located at various points on the harrow and I do not wish to be limited to the placing of the device on the harrow at any particular point.

While I have illustrated and described a particlar embodiment of my invention, it has merely been for the sake of convenience and I do not wish to be limited to that particular embodiment as it is obvious that numerous changes may be made in the details of construction without departing from the spirit of the invention or exceeding the scope of the appended claim.

What I claim is:—

The combination with a harrow having a plurality of tooth carrying bars, of a shaft, a semi-circular rim rotatably mounted on said shaft and having teeth on the forward end thereof, the portion of the rim which is located forwardly of the shaft being of greater weight than the portion which is located rearwardly thereof, a spring pressed rod for normally preventing the downward movement of the forward end of the rim and a spring detent for preventing the movement of the rim in the opposite direction.

In testimony whereof, I affix my signature, in the presence of two witnesses.

MIKE G. SCHMITZ.

Witnesses:
 EDW. S. POWERS,
 E. O. PUTNAM.

Copies of this patent may be obtained for five cents each, by addressing the "Commissioner of Patents, Washington, D. C."